United States Patent [19]

Johnson

[11] Patent Number: 4,513,555

[45] Date of Patent: Apr. 30, 1985

[54] BARN DOOR FRAMING SYSTEM

[75] Inventor: Larry Johnson, Sterling, Ill.

[73] Assignee: Lawrence Brothers, Inc., Sterling, Ill.

[21] Appl. No.: 453,692

[22] Filed: Dec. 27, 1982

[51] Int. Cl.[3] .............................................. E04C 2/38
[52] U.S. Cl. ...................................... 52/657; 49/501; 52/475; 52/793; 403/205; 403/231
[58] Field of Search ................. 52/657, 656, 785, 793, 52/475, 790; 403/205, 403, 231; 49/501; 160/381

[56] References Cited

U.S. PATENT DOCUMENTS

| | | | |
|---|---|---|---|
| 2,948,026 | 8/1960 | Shils | 52/656 X |
| 2,996,161 | 8/1961 | Etling | 52/475 |
| 3,304,108 | 2/1967 | Hamilton et al. | 52/656 X |
| 3,479,070 | 11/1969 | Marateck et al. | 52/657 X |
| 3,534,431 | 10/1970 | Uphoff | 16/82 |
| 3,802,393 | 4/1974 | Naylor | 119/27 |
| 3,949,526 | 4/1976 | Sherlock et al. | 52/790 X |
| 4,021,988 | 5/1977 | Edeus | 52/656 |
| 4,081,880 | 4/1978 | Edeus | 16/90 |
| 4,193,245 | 3/1980 | Johnson | 52/656 |
| 4,273,072 | 6/1981 | Choisel | 119/27 |
| 4,408,928 | 10/1983 | Steinke | 403/405 |

OTHER PUBLICATIONS

*HNP Industries brochure*, entitled "Kwik-Frame", two sheets—undated.

*Price/Macemon brochure*, entitled "Agricultural and Industrial Door Systems"—12 pages—undated.

*National Mfg. Co. brochure*, entitled—"Tab-Loc" 23 pages, undated.

*Primary Examiner*—Philip C. Kannan
*Attorney, Agent, or Firm*—Trexler, Bushnell & Wolters, Ltd.

[57] ABSTRACT

There is disclosed a door framing system for a barn door or the like wherein a plurality of horizontal and vertical frame members are joined together to define a generally rectilinear frame structure. All of the frame members are fabricated from substantially U-shaped channel members of similar cross-section, such that they may be cut from stock material of said U-shaped cross-section. Corner joining brackets are employed which include a pair of transversely disposed base sections, with spaced side flanges extending from each said base section to provide a U-shaped surface configuration which will embrace the outer side faces of the frame members. The brackets including clamping means for coupling the brackets to the respective frame members. There is also disclosed various bracing structures for such a door frame construction, as well as various hardware for effecting hanging of the door, guiding of the door with respect to a building structure and stop means for maintaining the door in the proper closed position.

7 Claims, 23 Drawing Figures

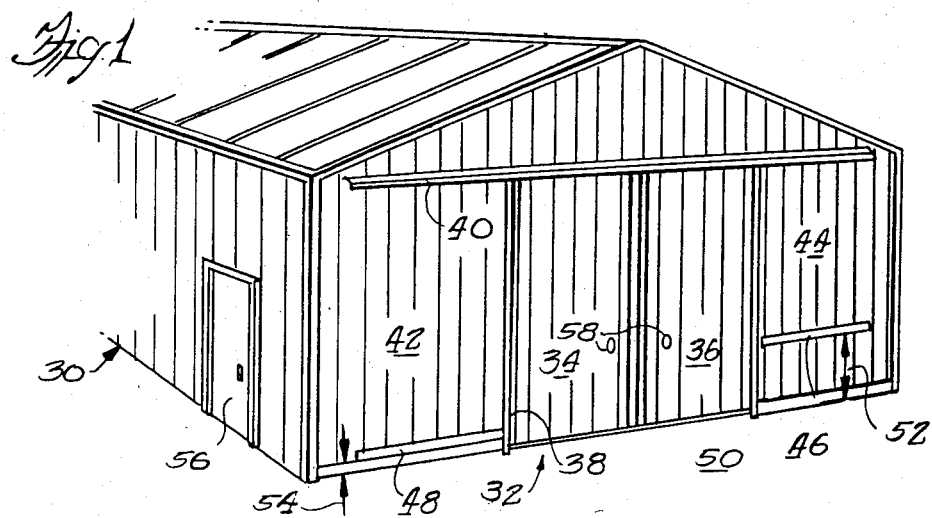
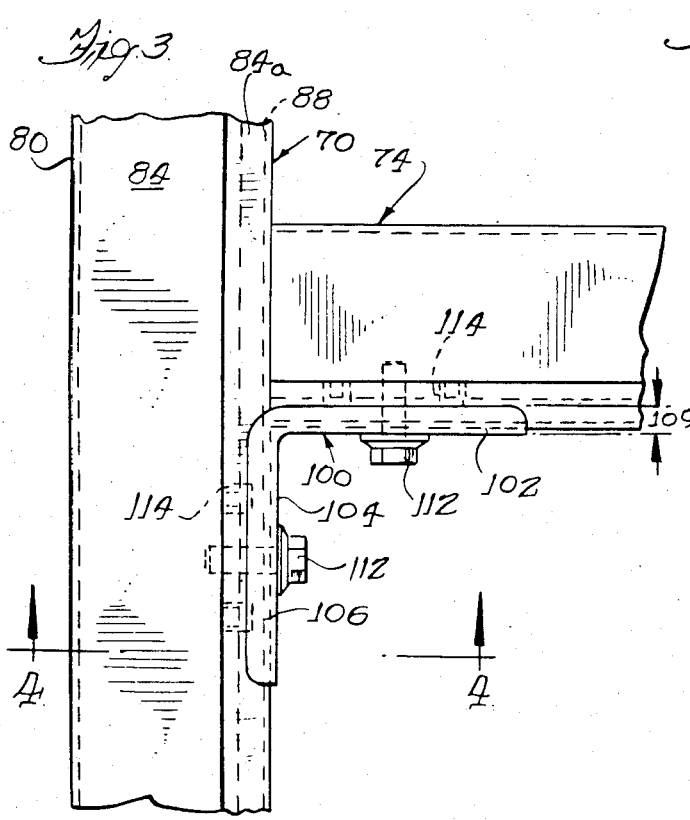
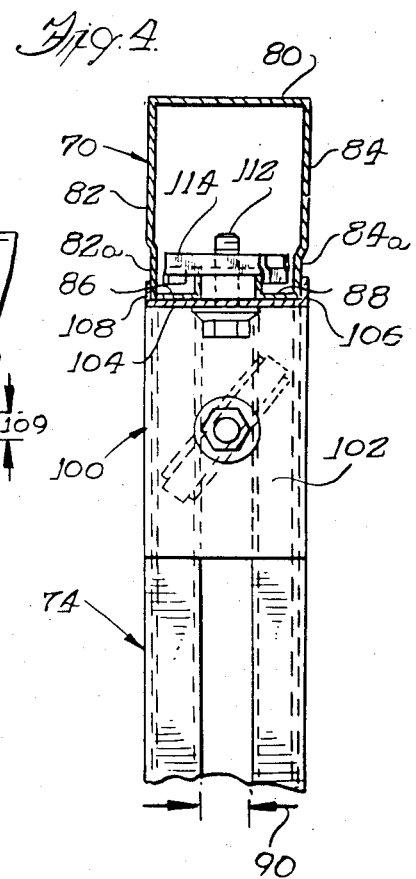

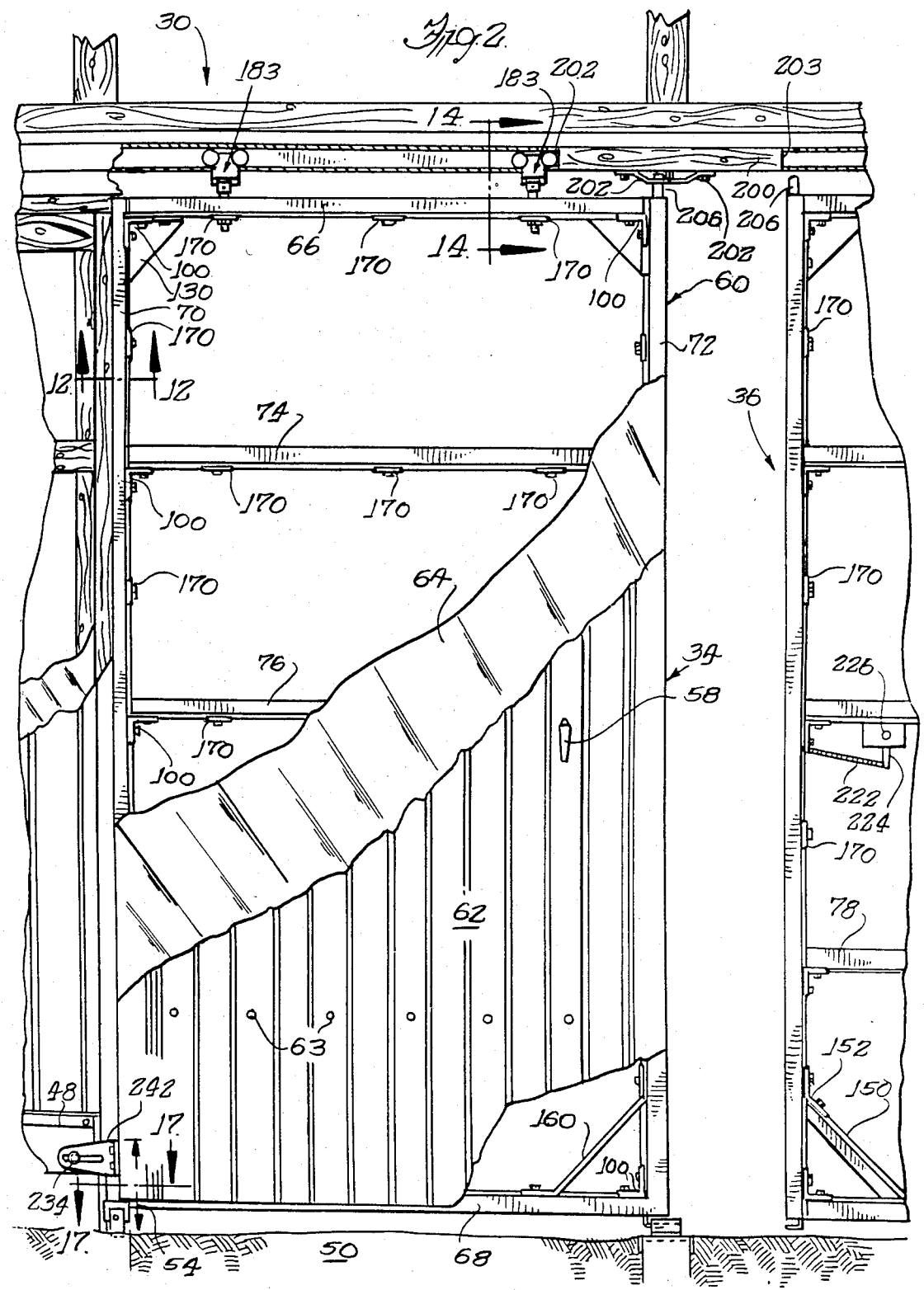

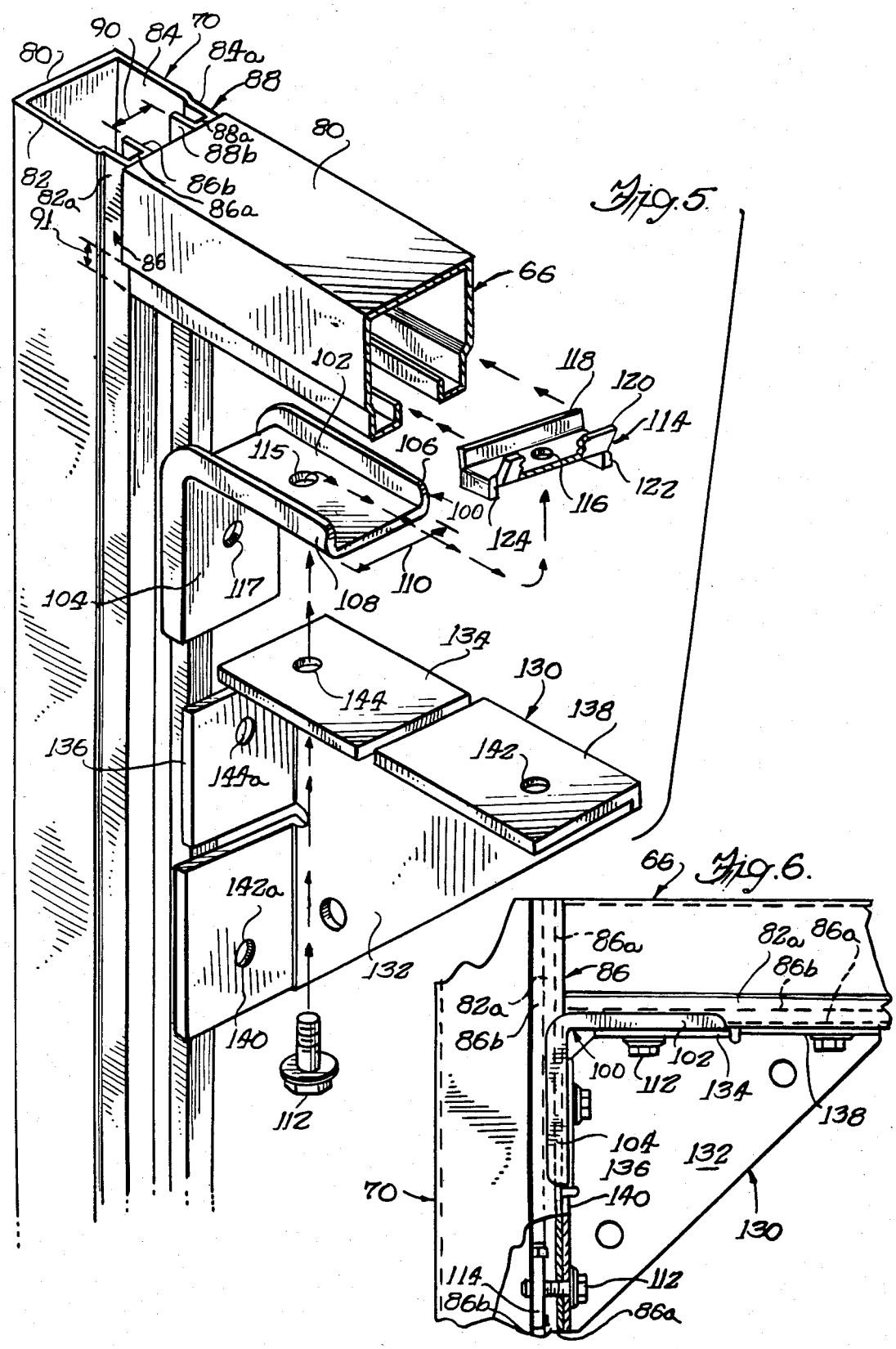

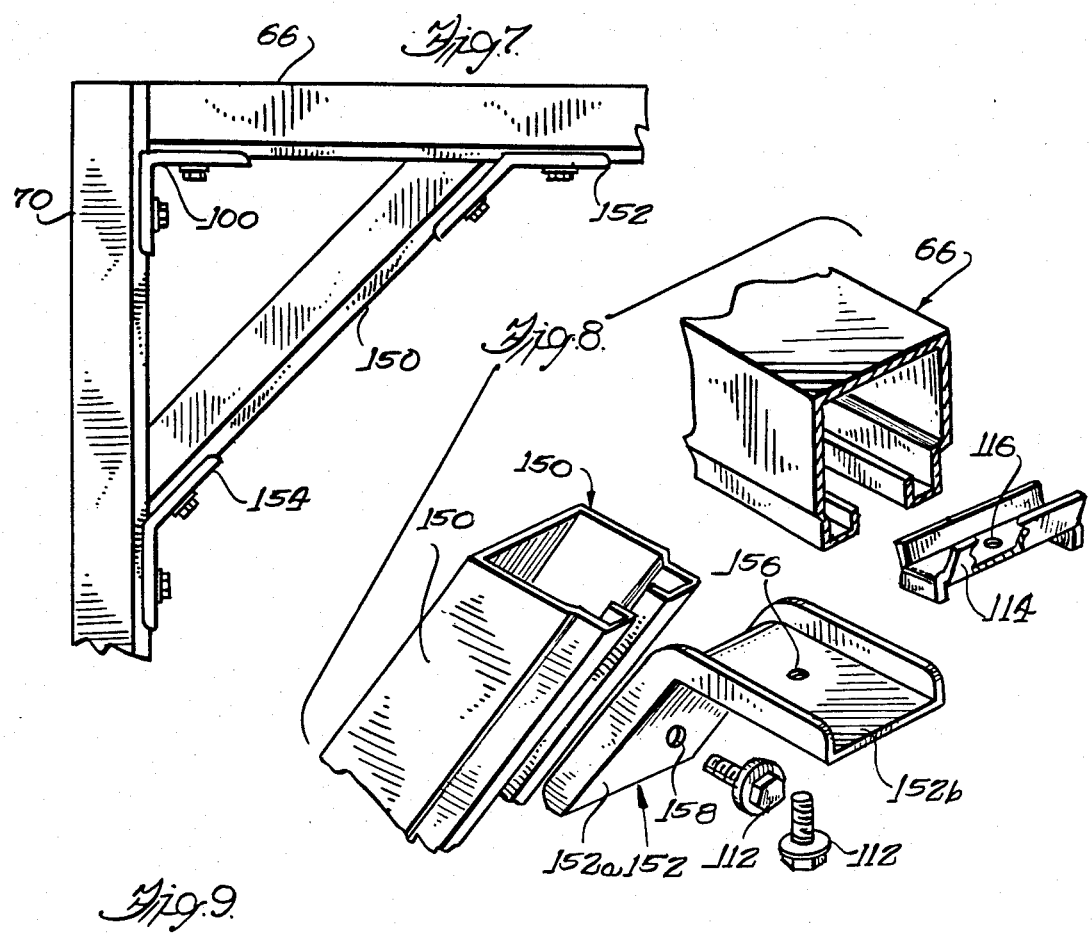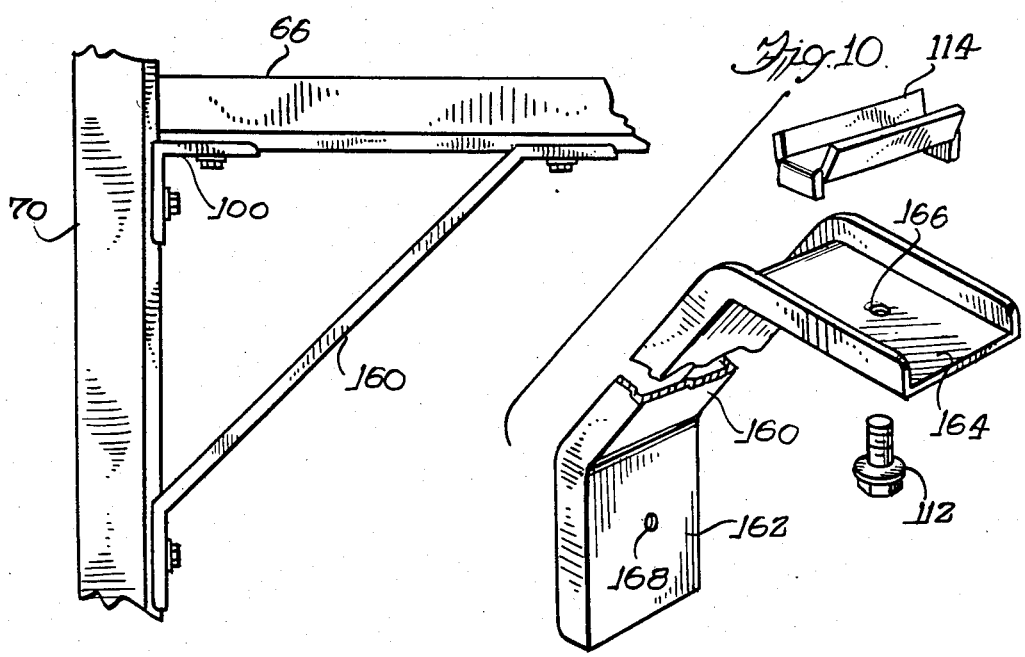

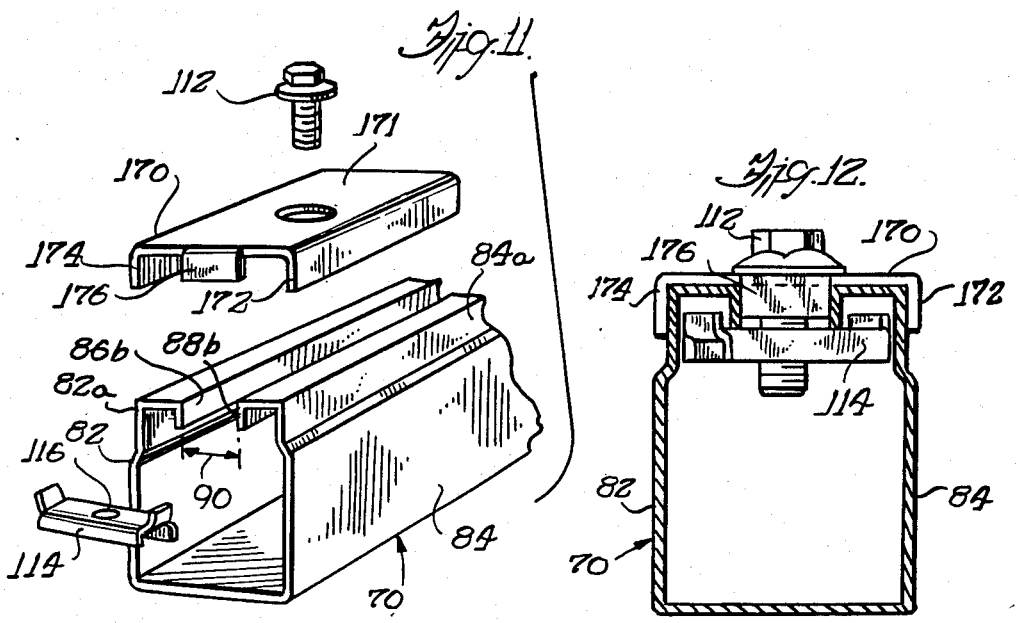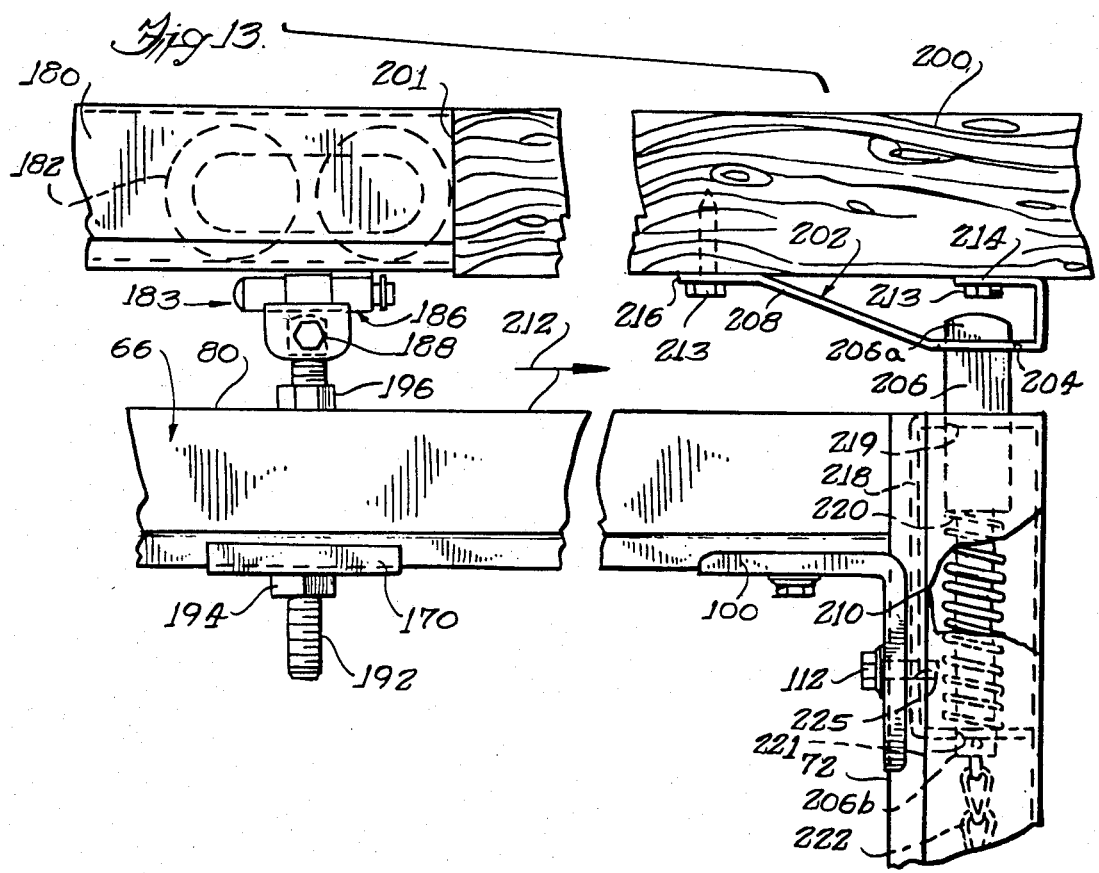

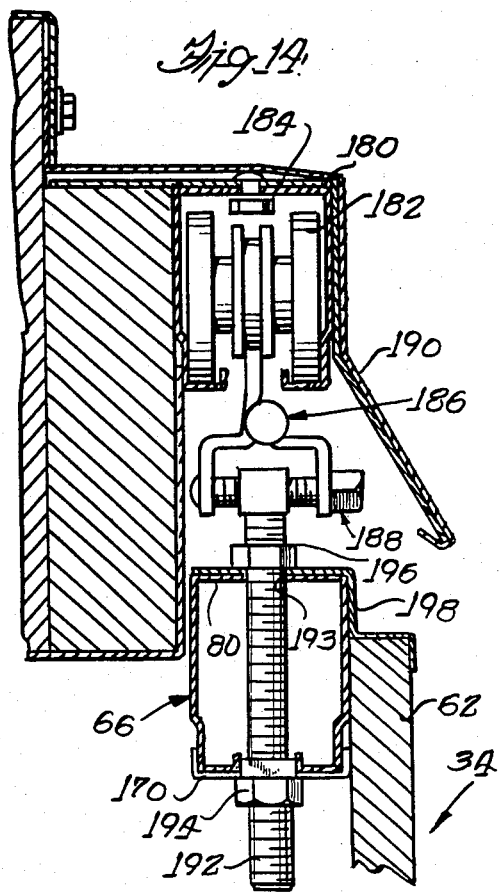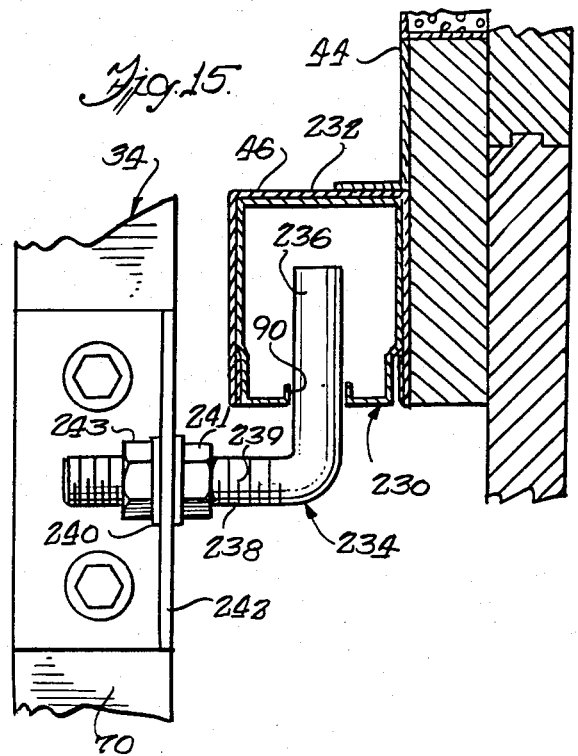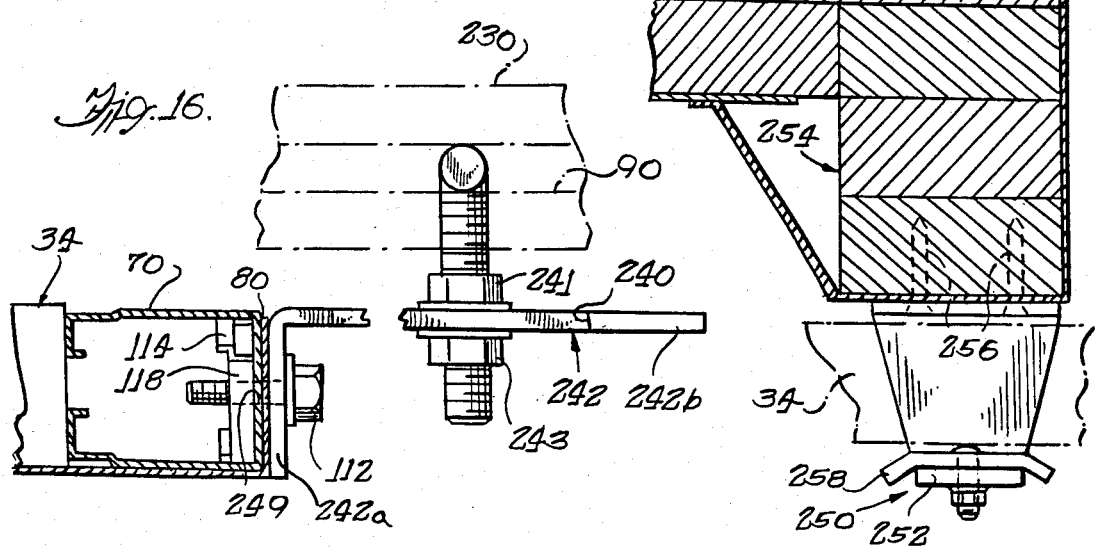

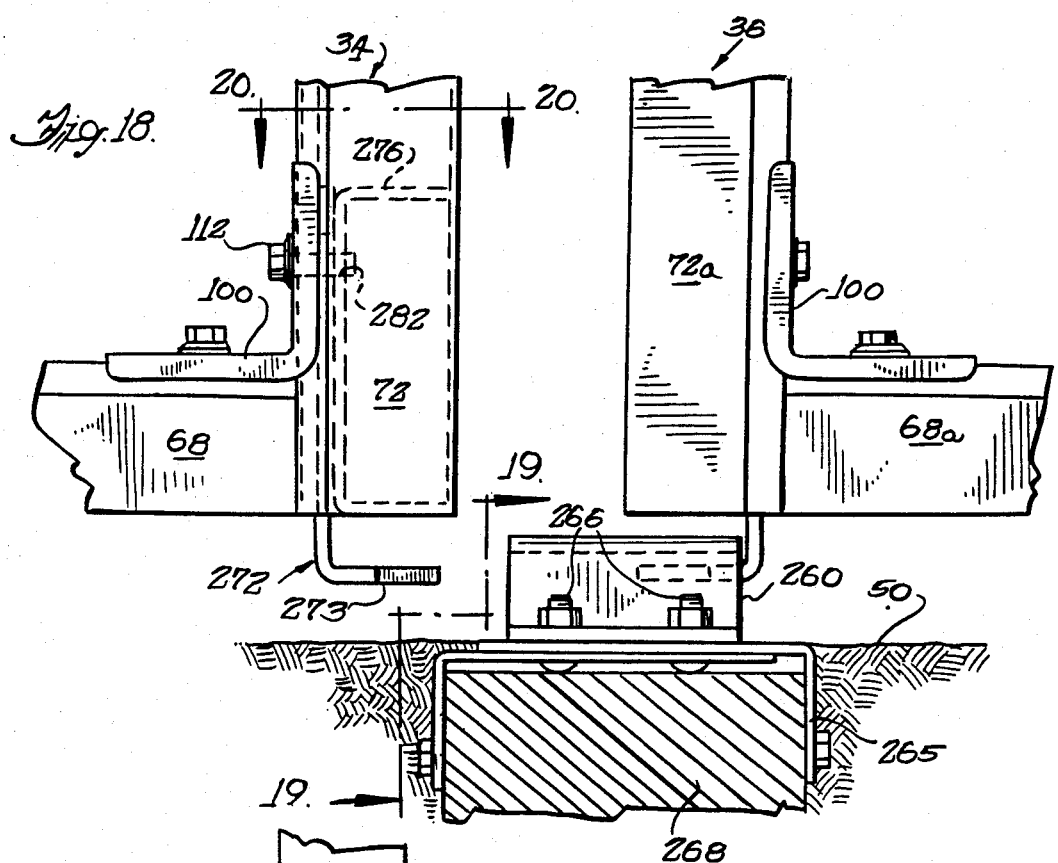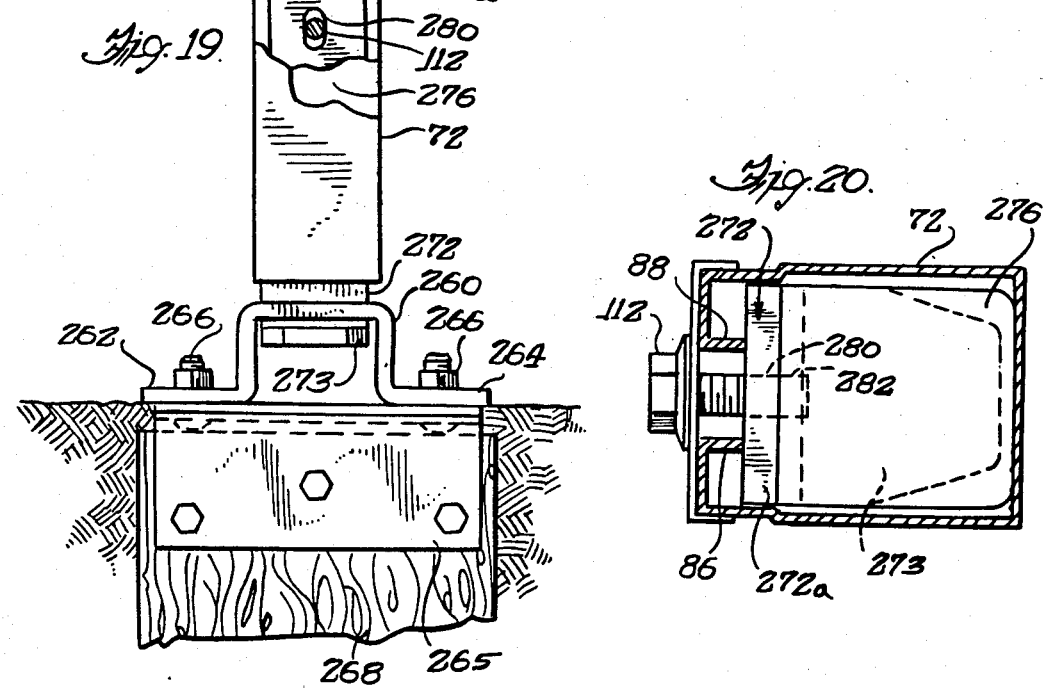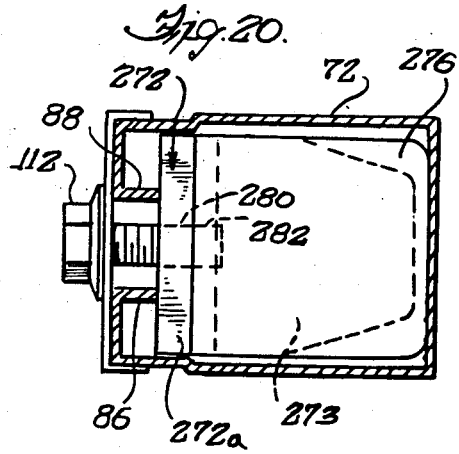

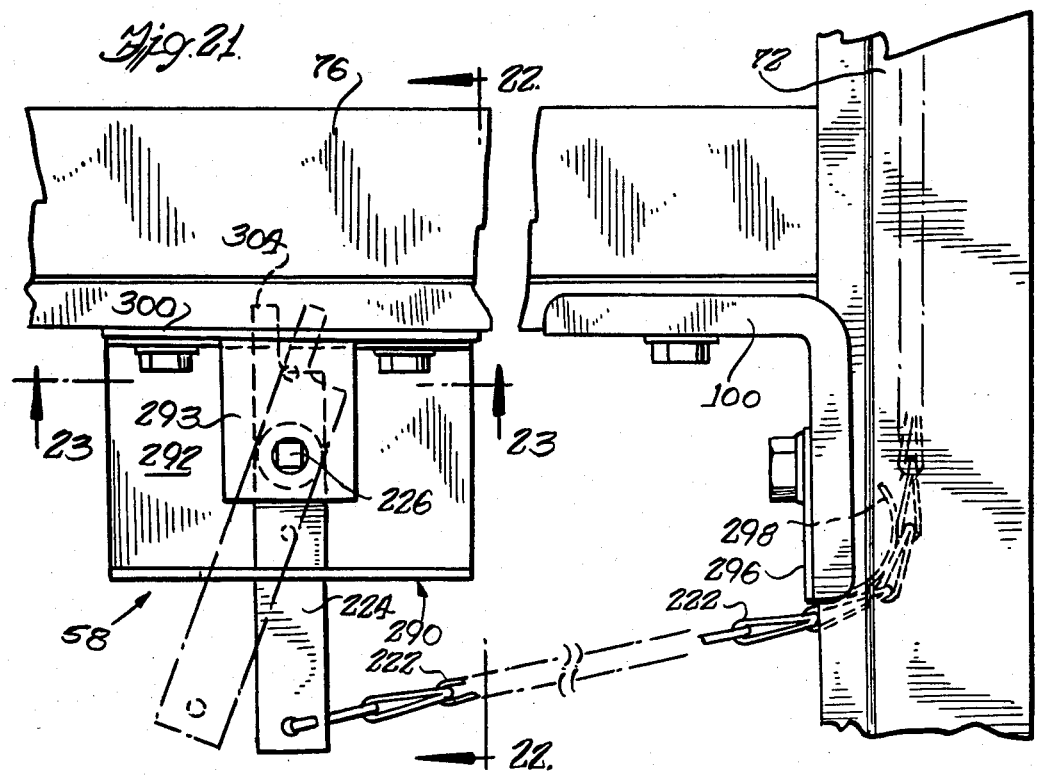
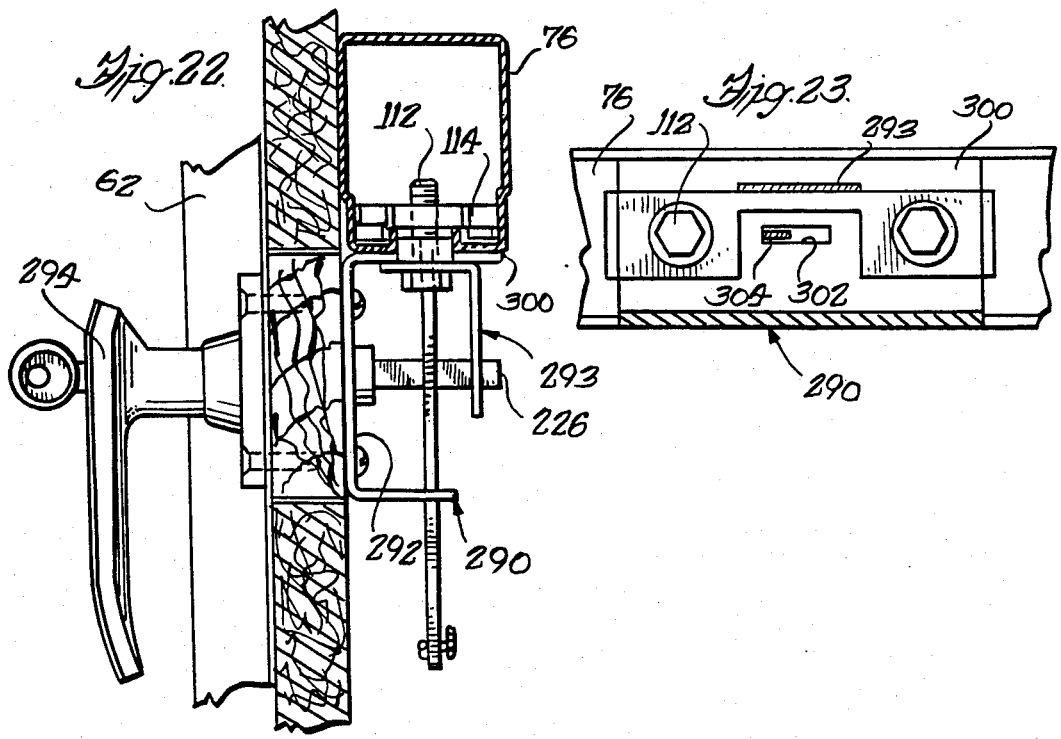

BARN DOOR FRAMING SYSTEM

BACKGROUND OF THE INVENTION

This invention is directed to improvements in a door frame system for a sliding door construction of the type used for barns or similar structures. The invention is directed to improvements of the door construction as a whole, as well as to various novel component features thereof.

Sliding door constructions for relatively large doors such as are used in barns or similar buildings are well known in the art. In addition to barns, such buildings generally include commercial or industrial buildings, which may take the form of a rigid framework structure covered with a suitable siding, often of aluminum or similar materials. While many advances have been made in the construction of such buildings, there remains room for improvement in the laterally sliding doors commonly provided for such structures. In this regard, such doors are generally relatively large to provide of ingress and egress of large vehicles, livestock, or the like.

A number of problems have arisen with sliding door constructions heretofore in use. Such door constructions, in similar fashion to the buildings mentioned above generally comprise a framework of wood, metal or other material upon which a "skin" or covering of siding, often of aluminum, is attached. Such sliding doors are subject to damage and deformation from a variety of sources when in use. For examples, vehicles, livestock or other objects moved through the doors may inadvertently collide with the door causing damage or deformation to portions of the skin, to the frame or both. Additionally, wind damage is frequently encountered. In this latter regard, in view of the relatively large size of such doors, sudden gusts of wind may dislodge the doors from the track or tracks generally provided therefor. Such wind damage may also cause deformation or damage to the skin, to the frame or both in cases where the door is inadequately supported by the tracks or other support structures.

Heretofore, repair of such damage has proven relatively difficult and expensive. In most door constructions heretofore provided, repair of even relatively minor damage such as bent or deformed frame sections has usually required removal of the door structure from the building. Thereupon, the door must be extensively disassembled to effect replacement or repair of the damaged part or parts, then re-assembled and remounted to the building. Additionally, the door structures heretofore provided have generally comprised a number of differently configured frame members of differing lengths as generally required to provide vertical sides or uprights, horizontal top and bottom frame members and one or more intermediate support members. Hence, in order to construct or repair such door structures, the contractor or supplier firm had to stock a large inventory of different frame components of varying lengths, in an effort to accommodate anticipated future construction and repair requirements. Needless to say, this has proven most difficult and expensive from a standpoint of inventory maintenance and control.

As an additional matter, sliding door constructions heretofore provided have frequently encountered difficulties in operation once installed on a building. In particular, track or guide members have generally been provided at the top and bottom surfaces of the assembled doors. The bottom track or guide usually comprises an open channel member for slidably receiving a bottom edge of the door. In operation this channel frequently becomes clogged with dirt, gravel or other debris, making opening and closing of the sliding door difficult or impossible. Moreover, it has been found that these bottom guide channels become filled and clogged with snow and ice quite readily, even with but a minimum snowfall. Such clogging, from whatever source, impedes or prevents sliding of the door for opening and closing.

Top guide members heretofore provided have generally consisted of a wheeled "truck" assembly from which a top portion of the door is suspended, which truck rides in a track attached to the building above the top of the door. This suspended operation has proven generally satisfactory in most instances. However, the phenomena known as "lifting" of the door in response to sudden gusts of winds has been encountered in many instances. Such "lifting" phenomena tend to lift the entire door assembly, often releasing it from its bottom track or guide members even when the door is in a fully open or fully closed position. A related wind problem is that of twisting or torque forces applied to the door, which may also cause severe distortion of the door frame or siding or both if the door is not adequately supported. This latter wind damage often occured even when the door constructions heretofore provided are in fully open or fully closed positions.

As an additional matter, reliable positive latching and unlatching of such sliding door constructions from the outside of the building has rarely been provided heretofore. Many such constructions require additional access doors to the building for the purpose of manipulating various latching and closure assemblies located on the inside of the sliding door structures. In this regard, particular difficulty has heretofore been encountered in achieving satisfactory latching and support when the doors are closed for protection from wind damage in constructions in which sliding doors are provided in pairs. The doors of such a pair usually meet or butt up against each other substantially at a center of a doorway when in the closed condition and slide laterally oppositely to overlie opposite adjacent sides of the building when in the open condition.

OBJECTS AND SUMMARY OF THE INVENTION

Accordingly, it is a general object of the invention to provide a novel and improved sliding door construction which avoids the problems of the prior art.

A more specific object is to provide a sliding door construction which uses but a minimum of relatively simple and standardized parts, thus minimizing the problems of inventory maintenance and control for providers of construction and/or repair services.

A related object is to provide a door construction in accordance with the foregoing object employing a minimal number of standardized construction members for simplified assembly and disassembly to facilitate both initial construction and later repairs.

A further object is to provide a sliding door construction employing a novel and improved guide track construction and arrangement which substantially avoids the problems of the prior art.

A related object is to provide a sliding door construction in accordance with the foregoing object which further employs a novel center door stop and latching arrangement for structures employing double sliding door arrangements.

A further object is to provide a novel sliding door construction in accordance with the foregoing objects which is relatively simple in its construction and yet highly durable and reliable in operation over a long service life.

Briefly, in accordance with one aspect of the invention there is provided a novel and improved sliding door construction for a door comprising a frame and siding type construction, wherein the frame member comprises vertically spaced top and bottom horizontal frame members and a pair of horizontally spaced vertical side frame members coupled with the top and bottom frame members at respective end portions thereof to define a generally rectilinear frame, wherein all of said top, bottom and side frame members comprise elongate, substantially U-shaped channels which are substantially identical in cross-section.

In accordance with another aspect of the invention there is provided a novel stiffener bracket member for frame members of a frame construction comprising generally U-shaped channel members. The stiffener bracket member comprises a relatively short, U-shaped member, the sidewalls of which are complimentarily shaped for embracing outer side surfaces of the U-shaped channel member and including at least an additional upwardly extending tongue or flange member oriented and dimensioned to closely interfit between inner sidewall surfaces of the U-shaped channel member, whereby the addition of one or more similar such stiffener brackets to a length of said U-shaped channel member increases the overall strength of the member.

In accordance with another aspect of the invention there is provided a novel corner bracket assembly for joining adjacent ends of similar channel frame members as described above to form the corners of a door frame. The novel corner brackets assemblies comprise U-shaped bracket members formed at substantially right angles with the sidewalls thereof oriented and dimensioned to embrace facing open ends of the U-shaped channel members.

In accordance with yet a further aspect of the invention there is provided a novel clamping arrangement for joining respective corner brackets and stiffener brackets with channel frame members as described above. This novel clamping arrangement comprises an externally threaded screw-type fastener and a mating internally threaded nut member dimensioned to slideably interfit through the open face of the channel frame member. The internally threaded nut member is preferably provided with a length dimension somewhat greater than the lateral extent of the interior of the channel member so as to non-rotatably engage facing interior sidewalls upon advancement and rotation of the threaded screw-type fastener with respect thereto.

In accordance with a further aspect of the invention additional forms of corner bracing members may be provided to coact with the corner bracket assembly above described for providing additional rigidity and structural strength to respective corners of a frame assembly.

In accordance with a further aspect of the invention a novel guide track arrangement is provided which may be mounted oriented downwardly and at any desired level upon the adjacent side of a building to substantially avoid clogging due to ingress of dirt, debris, snow, ice or the like.

In accordance with yet a further aspect of the invention a novel center door stop arrangement employing reliable stop means for the bottom portions of the sliding doors is provided.

In accordance with yet another aspect of the invention a novel hanger arrangement is provided for hanging a sliding door assembly from a track-mounted truck assembly, while substantially avoiding vertical displacement of the door assembly in response to wind induced lifting or other forces applied thereto.

In accordance with a still further aspect of the invention, there is provided a novel center latching assembly for positively latching one or a pair of sliding doors in a closed condition, which latching assembly is further capable of being operated from the exterior side of the door.

The foregoing aspects and features of the invention are contemplated for use either singly or in combination to achieve a novel sliding door construction in accordance with the invention.

BRIEF DESCRIPTION OF THE DRAWINGS

The foregoing as well as other objects, features and advantages of the invention will become more readily apparent upon reading the following detailed description of the illustrated embodiment, together with reference to the drawings wherein:

FIG. 1 is a partial perspective view of a building employing a sliding door assembly of the type to which this invention pertains.

FIG. 2 is a partial, enlarged front elevation of the doors of the building of FIG. 1, broken away to illustrate various features of the novel door assembly and construction of this invention;

FIG. 3 is a fragmentary elevation illustrating a novel corner bracket assembly in accordance with features of this invention;

FIG. 4 is a sectional view taken generally along the line 4—4 of FIG. 3, and rotated by 90 degrees;

FIG. 5 is an exploded perspective view illustrating assembly of a corner portion of a novel door frame assembly in accordance with one form of the invention;

FIG. 6 is an elevational view, partially in section and partially broken away, illustrating the assembled condition of the components shown in FIG. 5;

FIG. 7 is an assembled view of a corner portion of a frame assembly, similar to FIG. 5 and illustrating another form of construction in accordance with the invention;

FIG. 8 is a fragmentary exploded perspective view illustrating further features of the assembly of FIG. 7;

FIG. 9 is an elevation similar to FIGS. 6 and 7 and illustrating yet another form of corner construction in accordance with the invention;

FIG. 10 is a fragmentary perspective view illustrating a corner bracing component utilized in FIG. 9;

FIG. 11 is an exploded perspective view illustrating a novel stiffener bracket and coupling arrangement for use with the frame members in accordance with this invention;

FIG. 12 is a sectional view illustrating assembly of the part shown in FIG. 11;

FIG. 13 is a fragmentary front elevation illustrating a novel hanger assembly for hanging a sliding door from an overhead track and a center door latch arrangement, both in accordance with this invention;

FIG. 14 is a sectional view further illustrating novel aspects of the door hanger assembly portion of FIG. 13;

FIG. 15 is a side elevation partially in section, illustrating a novel door guide assembly in accordance with the invention;

FIG. 16 is a top elevation, partially in section, further illustrating details of the guide assembly of FIG. 15;

FIG. 17 is a top plan view, partially in section, taken generally along the line 17—17 of FIG. 2 and illustrating a novel door edge guide assembly in accordance with this invention;

FIG. 18 is an enlarged plan view, partially broken away illustrating a novel center door stop assembly in accordance with this invention;

FIG. 19 is a developmental view taken generally on the line 19—19 of FIG. 18;

FIG. 20 is a sectional view taken generally on the line 20—20 of FIG. 18;

FIG. 21 is a partial view illustrating the operating mechanism for the overhead latch of FIG. 13;

FIG. 22 is a sectional view taken along the line 22—22 of FIG. 21;

FIG. 23 is a sectional view taken along the line 23—23 of FIG. 21;

DETAILED DESCRIPTION OF THE ILLUSTRATED EMBODIMENT

Referring to the drawings and initially to FIG. 1, a typical barn or similar building is shown and designated generally by the reference numeral 30, and of a frame-and-siding type of construction. Such buildings are generally well known in the art. In accordance with the invention a novel sliding door assembly designated generally by the reference numeral 32 is provided for the building 30. In the illustrated embodiment, the door assembly 32 comprises a pair of similar sliding doors 34 and 36 which meet generally at a center portion of the associated doorway 38 to define the fully closed position thereof. In accordance with conventional practice, these doors 34 and 36 are suspended from an overhead guide track 40 by suitable means as will be seen later, to open laterally outwardly over adjacent side surfaces 42, 44 of the building 30.

In accordance with a feature of the invention, novel lower guide members 46 and 48 are provided which, as will be seen later, are mounted with an open side wall facing downwardly and also some suitable distance above the ground or grade surface 50. Advantageously, this inverted mounting and the placement of guide members 46 and 48 spaced above the ground or grade surface 50 avoids obstruction or clogging thereof by dirt, debris, snow or ice. Such clogging was often a problem in prior art constructions.

In the example illustrated in FIG. 1 the guide member 46 is located a distance 52 above the grade surface 50 while the guide member 48 is located a distance 54 spaced above the grade surface. This illustration is by way of example only, the guides 46 and 48 normally being placed at the same level. However, FIG. 1 does illustrate that this level may be any selected level as will be more fully described later.

An additional access door 56 is provided in the building 30 as illustrated in FIG. 1. However, in accordance with another feature of the invention the sliding doors 34 and 36 are provided with a novel latching system to be described later, which may be operated via handle mechanisms 58 on the exterior side of the doors 34 and 36; the mechanisms 58 being discussed with regard to FIGS. 21-23. In many prior art structures such latching or locking systems have not heretofore been available, an access door such as the door 56 being required to enter the building to unlatch the sliding doors from the interior. However, in the present example, the access door 56 is provided for convenience only in view of the exterior accessible latching feature as will be described later. If desired the access door 56 may be provided directly in one of the sliding doors 34 or 36.

Referring now to FIG. 2 an enlarged view of the sliding door 34 partially broken away and a fragmentary view of an edge portion of the door 36 illustrate the substantially identical constructions thereof. Hence, only the door 34 will be described in detail in being understood that the door 36 is substantially identical in construction.

In accordance with the illustrated embodiment, the door 34 comprises a rectilinear frame system or assembly 60 to which is mounted a suitable siding material 62, preferably to match the siding of the exterior of the building 30. The novel construction of the invention as will presently be seen further permits a layer of suitable insulation 64 to be applied to the frame 60 intermediate the outer skin or siding 62 thereby providing an insulated door. In many prior art constructions, application of such insulation was difficult or impossible. Such insulation 64 may be added even some time after construction and installation of the door by the simple expedient of removing the skin or siding 62 which may be relatively simply and inexpensively removed and reapplied to the frame 60 using conventional screw type fasteners 63.

In accordance with a feature of the invention, the door frame 60 comprises a plurality of frame members including substantially identical top and bottom horizontal frame members 66 and 68. The top and bottom frame members 66 and 68 are joined at respective ends thereof with substantially identical vertical side frame members 70 and 72, to define substantially square corners. Suitable corner joining brackets 100 as will be described later, couple the respective top and bottom frame members 66 and 68 with side frame members 70 and 72 to define the substantially rectilinear frame structure 60. One or more intermediate frame members 74, 76 and 78 (see door 36) are also provided in the illustrated embodiment. Similar corner joining brackets 100 are utilized to couple these intermediate frame members 74, 76 and 78 to intermediate portions of the respective side frame members 70 and 72. Fewer or more such intermediate members may be utilized in accordance with the size of the doors 34 and 36 to be provided. Moreover, the intermediate frame members may be oriented vertically rather than horizontally as appropriate for the particular shape and size of the door to be provided.

Referring now to FIGS. 3 through 5 inclusive, additional novel features of the frame members and corner brackets described above and the cooperation therebetween in the formation of corner joints will be described. Initially, it will be noted that all of the frame members described herein comprise generally U-shaped channel members which are substantially identical in cross-sectional configuration. Advantageously, then, the builder need not carry a large inventory of parts for either construction or repair of doors constructed in accordance with the invention. Rather, only a quantity of channel stock material is required, so that individual pieces to form the frame members thus far described, may be cut to length as required for a particular door. This greatly facilitates both initial construction and later repair of sliding doors of any desired shape or size as required for a particular building installation.

Referring now more particularly to FIGS. 4 and 5 the frame channel members 70, 74 and 66, 70 are respectively illustrated. Here, it will be seen that in cross-section each of these channels comprises a generally U-shaped elongated channel member which may be constructed for example by either an extrusion process or a forming procedure. This standardized channel member generally includes a base wall portion 80 which integrally joins a pair of substantially parallel side walls 82 and 84, which are formed at substantially right angles to the base wall 80. Advantageously, these side walls 82 and 84 are formed to cooperate with a corner bracket assembly 100 which will be described presently. In this regard, these walls 82 and 84 are inwardly recessed or stepped somewhat at end portions thereof remote from the base wall 80 to form a pair of substantially co-extensive and parallel recessed surfaces 82a and 84a. These recessed surfaces 82a and 84a define a height dimension 91 and recessed by an amount substantially similar to the thickness of the material utilized to form the channel member 70 in the illustrated embodiment. However, as will presently be seen the amount of this recess or inward stepping of these wall portions 82a and 84a is also such as to accommodate the similar thickness of a portion of a bracket member 100 which is applied thereto to form a corner between channel members 66 and 70. As such the resulting joint provides a relatively smooth exterior surface which facilitates application of the siding 62 or insulation 64.

Extending from the side walls 82 and 84 are a pair of integrally formed, composite flange members 86 and 88 which are substantially identical and oppositely oriented. The composite flange members serve to define an open side wall for the U-shape configuration of the frame members. Briefly, each composite flange member includes a first inwardly extending portion 86a, 88a which is substantially parallel with the base wall 80. Second flange portions 86b, 88b are formed integral with and transverse to respective first portions 86a 86b, extending inwardly of the U-shaped channel. These second flange portions 86b and 88b are substantially parallel with each other and with the respective sidewalls 82 and 84. The space between these second flange portions 86b and 88b defines a slot in the partially open side wall portion of the channel member 70 and is here designated by the reference numeral 90, FIG. 5.

Directing attention to FIGS. 3 and 4, the corner bracket member 100 comprises first and second sections or base surfaces 102 and 104 which are formed at substantially a right angle. This bracket member 100 is formed to a generally U-shaped configuration which defines respective outwardly extending sidwalls 106 and 108 which are substantially perpendicular to the base surfaces 102, 104 and co-extensive therewith. The height 109 of these sidewalls 106, 108 is no greater than the height dimension 91 of the recessed channel surfaces 81a, 84a. The width dimension 110 between the respective sidewalls 106 and 108 is substantially the same as the dimension between the outer surfaces of the inwardly recessed portions 82a and 84a of the walls of the channels such as channel 70 described above. (It will be remembered that all the channel members heretofore described are substantially identical in cross-sectional configuration.) Moreover, the thickness of the material forming walls 106 and 108 of the bracket 100 is substantially the same as the amount of inward recess of these wall portions 82a and 84a, whereby the bracket member 100 closely interfits with the sides of each channel. Advantageously, then, the brackets 100 provide additional strength about the end pairs of the channels resisting outward deformation thereof. Additionally, the assembled bracket and channel together define substantially planar composite outer side surfaces. This latter feature is particularly advantageous in applying the siding 62 and/or or insulation 64 as illustrated in FIG. 2 to the assembled frame member, without any interference from protruding surfaces which might otherwise cause unsightly bumps or ripples in the assembled door. As best seen in FIG. 2, substantially identical bracket members 100 may be utilized to interconnect all corners formed between the respective frame members described herein.

In accordance with a further feature of the invention, a novel coupling or fastener arrangement is provided for joining these brackets 100 with respective channel members to form the corners therebetween. This coupling arrangement comprises a conventional externally threaded screw or bolt types fastener 112 and an elongate nut-like mating fastener element 114.

The mating fastener element 114 comprises a relatively narrow elongate member having a central through aperture 116 which is tapped to mate with the threaded screw or bolt 112. In the illustrated embodiment, the elongate fastener member 114 is also generally U-shaped having a pair of upturned sidewall portions 118 and 120. Preferably, the spacing between outer extremeties of the sidewalls 118, 120 is no greater than the spacing 90 defined by the flange portions 86b, 88b forming the opening or slot in the open side wall of the U-shaped channel members. However, the overall length of the fastener member 114 is preferably greater than the cross-sectional dimension of the interior of the channel member between interior surfaces of sidewall portions 82a and 84a to limit rotative movement of the element 114 when assembled within the frame section 70. In accordance with an additional feature of the invention, the opposite end portions of the fastener member 114 are bent over to form downwardly extending ears or tabs 122, 124, extending oppositely of the sidewalls 118 and 120. Advantageously, these tabs aid in grippingly engaging the interior surfaces of respective flange portions 86a and 88b upon assembly and threadable engagement with the screw or bolt 112. Thus, relative rotation of the fastener member 114 is prevented during rotation of the fastener 112 in either direction by engagement with the interior surfaces of the channel as described.

Assembly of the foregoing parts is relatively simple. Initially the screw or bolt 112 is inserted through apertures 115 and 117 provided therefor in the bracket portions 102 and 104. Thereafer, the mating fastener element or nut 114 may be loosely threaded upon the bolt 112. Thereupon the respective fastener elements 114 are oriented to pass through the respective open slots 90 of the channel members 66 and 70. Upon rotation of the bolt 112 by a suitable drive tool it will be seen that initial rotation of the mating fastener elements 114 will cause its end parts to come in contact with one or both of respective sidewalls 82a and 84a of the respective channels 66 and 70 preventing further rotation. In this regard, the length of fastener 112 is preferably such that the mating fastener 114 will not extend into the space between side walls 82, 84, that is, above the height or extent 91 of side wall portions 82a, 84a. The bolt 112 may then be tightened, thereby drawing the mating fastener 114 tightly into engagement against the upper or innermost edges of respective flange portions 86b and 88b, forming a tight reliable corner joint between bracket 100 and respective channels 66 and 70. As the fastener elements 114 are drawn into engagement with flange portions 86b and 88b, the tabs 122, 124 will be disposed within interior frame channels defined by the composite flange members 86 and 88 and the respective sidewall portions 82a and 84a. This serves to further resist and control rotation of nut elements 114, as well as strengthen the channel or frame members 66 and 70. In this regard the tabs 122 and 124 are locked within the interior channels of the frame defined by the flange mambers 86 and 88, which prevents the nut member 114 from rotating. Thus any forces tending to collapse the frame cross-section will be resisted by the nut members 114; since they are in effect locked in place due to the disposition of tabs 122 and 124 within the interior frame channels.

Referring now to FIG. 5 and FIG. 6, a corner brace member 130 may be employed with the bracket assembly 100 to further strengthen the corner joint formed as described above, when needed due to the size of the door or to provide an increased degree of structural strength or integrity. This corner brace member 130 is preferably of greater thickness than the materials forming the channels and corner bracket heretofore described and includes a flat web or wall portion 132. The web or wall 132 defines at least one right angle corner, and in the illustrated embodiment is generally triangular in form. To either side of the right angle corner of the web 132 there is provided composite wall structures. These wall structures include bent over sidewall members 134 and 136 which are formed integrally with the web 132, preferably, at an angle of substantially 90 degrees with respect to the flat surface of the web 132. In addition to the sidewall members 134 and 136 the composite wall structure includes additional sidewall portions 138 and 140 disposed laterally of the first mentioned sidewalls 134 and 136.

It will be noted that the first sidewalls 134 and 136 are offset with respect to the sidewalls 138 and 140 so as to accommodate the thickness of the base portions 102, 104 of the corner bracket 100. As best illustrated in FIG. 6, the sidewall portions 134 and 136 closely interfit over the bracket 100 when assembled with respective channels 66 and 70 to form a corner joint. At the same time, the outer sidewalls 138 and 140 overlie and abut the respective open side of the channels 66 and 70 and in particular the facing surfaces of the first flange portions 86a and 88a thereof. In the illustrated embodiment, the side wall portions 134 and 136 of the brace member 130 extend respectively outwardly from a cut away corner portion of the web 132 to an extent at least as great as the outward extent of respective portions 102 and 104 of the corner bracket 100 which these sidewalls 134 and 136 overlie. In the illustrated embodiment, a small space or gap is provided between respective sidewalls 134, 138 on the one hand and 136 and 140 on the other hand. However, these walls might be formed continuously without departing from the invention, so long as the offset of sidewalls 134 and 136 is maintained.

Assembly of the additional brace member 130 with the corner bracket 100 and associated channels is facilitated by suitable through apertures 142 and 142a in sidewalls 138 and 140 and similar through apertures 144 and 144a in sidewalls 134 and 136. These through apertures are sized for accommodating additional ones of the fasteners or bolts 112 of a coupling arrangement similar to that as described above.

To effect assembly of the parts of FIG. 5, fasteners 112 and mating fastener elements 114 may be loosely pre-assembled through each of the apertures 142 and 142a. Thereafter, the corner bracket member 100 is aligned with the surfaces 134 and 136 so that the respective through apertures 144 and 144a are in alignment with through apertures 115 and 117. Similar coupling assemblies comprising mating fasteners 112 and 114 may then be loosely pre-assembled with these aligned apertures 115, 144 and 117, 144a, respectively Thereafter the pre-assembled bracket 100 and bracing member 130 may be aligned with the respective ends of channels 66 and 70 to be joined. The respective fastener members 114 are then inserted through the open face portions 90 of the channels and tightened as described above with reference to assembly of corner bracket 100 with channels 66 and 70. The downwardly depending end tabs 122 and 124 advantageously resist loosening or partial disengagement of the tightened fasteners 112, 114 due to vibration or the like while in service.

From the foregoing descriptions, it will be seen that disassembly of the parts thus far described for repair or the like is relatively simple. Only a simple tool is required to rotate respective bolts 112. Thereupon, fasteners 114 may be removed by reversing the assembly steps described above. Hence, repair of doors constructed in accordance with the invention is greatly facilitated. Moreover, since all channel members comprise suitable lengths of the same stock material, and all brackets and fasteners are respectively substantially identical, replacement thereof is simplified. The repair firm need only inventory channel stock which may be cut to required lengths "on the job", and a supply of the described brackets and fasteners.

Reference is next invited to FIGS. 7 through 10 wherein two additional corner bracing assemblies in accordance with alternative forms of the invention are illustrated.

Referring initially to FIGS. 7 and 8, a first alternative form of bracing member 150 is illustrated. This bracing member 150 comprises an elongate channel member which is preferably a length of channel material substantially identical in cross-section to the channel members 66, etc. previously described with reference to the frame members forming the frame 60 of FIG. 2. This section of channel member 150 is cut to suitable length and its end portions formed at angles so that it may be positioned to span the corner joint formed by bracket 100 with frame members 66 and 70. In the illustrated embodiment a miter joint is defined between substantially 45 degree angle cuts on the cross bracing channel 150 and respective faces of the frame member channels 66 and 70.

The respective ends of the brace or support channel 150 and frame members 66 and 70 are joined by bracket members 152 and 154 which are similarly configured to the corner bracket 100 described above. However, the transversely disposed sections of the brackets 152 and 154 are formed to accommodate the angle defined by the channel 150 and the frame members 66 or 70.

Coupling assemblies comprising bolt members and nut type fastener elements substantially identical with the mating fasteners 112 and 114 described above are utilized in similar fashion at either end of the angled bracket members 152 and 154 for coupling the brace channel 150 to the two frame member channels 66 and 70. From the foregoing it will be appreciated that assembly of the brace channel member 150 with respective frame channel members 66 and 70 is substantially identical with the assembly described above of the corner bracket 100 therewith. That is, the fastener members 112 and 114 may be pre-assembled with the respective bracket members 154 and 152 and thereafter aligned with respective open sidewalls of the brace channel 150 and of the frame member channels 66 and 70 and tightened to achieve a reliable and yet removable connection therebetween. Hence, the brace assembly may also be readily removed for replacement or repair if required.

Referring now to FIGS. 9 and 10 yet another embodiment of a brace arrangement is illustrated. In FIG. 9 a corner joint between typical frame members 66 and 70 is achieved as described above by use of the bracket assembly 100 including associated fasteners 112, 114. A brace member 160 is employed to strengthen the joint. In this regard, the brace 160 comprises an elongated bracket member or similar cross-sectional configuration as the bracket member 100. The respective outer end portions of this brace member 160, however, are formed at substantially a 45 degree angle to closely interfit with the respective channel members 66 and 70 in the same fashion as the sections 102 and 104 of bracket 100 interfit therewith as described above. The intermediate portion is relatively elongate and of a U-shaped cross-section, as shown in FIG. 10. Substantially identical coupling assemblies comprising fasteners 112 and 114 are utilized to effect assembly of brace 160 in much the same way as described above.

Reference is next invited to FIGS. 11 and 12 wherein a novel stiffener bracket assembly for enhancing the structural rigidity of the channel members providing the respective frame members described above is illustrated. This stiffener bracket is designated generally 170 and is of a generally U-shaped configuration. Preferably the stiffener bracket 170 is of substantially identical cross-sectional configuration as the U-shaped bracket members forming corner brackets 100, 152, 154 and bracing member 160 previously described. In this regard the bracket 170 includes a base portion 171 and upstanding sidewall portions 172 and 174, which are designed closely to embrace the inwardly recessed portions 82a and 84a of respective continuous sidewalls of the channel member 70 to which the bracket 170 is to be attached. The stiffener bracket 170 additionally includes tabs or flanges 176, which extend from base portion 171 in the same direction as sidewalls 172 and 174, only one such tab being shown in FIG. 11. These tabs or flanges 176 are preferably of width slightly less than the spacing 90 of the slot defined by the inwardly facing flange surfaces 86b, 88b of the channel member 70, so that the tabs 176 may be disposed between said facing flanges. In this regard, it will be remembered that all of the channel members comprising the frame members of frame 60 heretofore described are essentially identical in cross-section. Hence, interfitting of a plurality of similar stiffener brackets with these channel members at desired locations along their lengths is substantially identical for each channel member. In this regard a coupling assembly comprising the screw or bolt 112 and fastener member 114 described above is utilized in similar fashion as previously described to securely couple each stiffener bracket 170 with an associated frame member 70, as shown in FIG. 12. Preferably, and referring again briefly to FIG. 2, stiffener brackets 170 may be applied to each of the frame members at a plurality of spaced apart locations to enhance the rigidity of these members, as needed.

More specifically, with reference to the assembled construction of FIG. 12, it will be recognized that sidewalls 172 and 174 of stiffener bracket 170 embrace the frame member 70 and resist lateral outward deformation of the sidewalls 82, 84 of said member. The tabs or ears 176 which are located substantially centered with respect to the sidewalls 172 and 174 resist inward collapse or deformation of the sidewalls 82 and 84 of the channels. Accordingly, the provision of stiffener brackets 170, as described, at spaced apart locations on the respective frame members greatly, enhances the structural rigidity of the frame members in resisting inward or outward deformation of the frame cross-section.

In accordance with a further feature of the invention, it will be noted that all of the bracket members thus far described with respect to the frame structures 60 comprise a relatively few standardized parts. All of the bracket members thus far described are readily and simply formed from similar U-shaped stock material by cutting to the desired length and forming at desired angles. Formation of the stiffener bracket 170 differs only in the additional step of providing the folded over tabs or ears 176 at the respective ends thereof.

Reference is next invited to FIGS. 13 and 14 wherein a novel hanger assembly 183 for suspending the doors from an overhead guide track is illustrated; as is a latch arrangement for the sliding doors 34 and 36. In accordance with conventional practice, the sliding doors 34 and 36 are suspended from an overhead track 180 by means of a suitable wheeled truck structure or assembly designated generally 182, and which rides in said track 180. In accordance with the invention, the track 180 preferably comprises a suitable length of channel material of identical U-shaped cross sectional configuration to the stock channel material utilized to form the frame components thus far described. The track 180 may be affixed to the barn by suitable brackets 184 spaced along the width of the opening provided for the door 34, as illustrated in FIG. 14.

The hanger assembly 183 employs mutually transverse pivot structures 186 and 188 to provide freedom of movement of the door 34 in both the direction of sliding of the door 34 and the direction substantially perpendicular thereto. This arrangement assures relatively free sliding of the door 34 without interference from the adjacent surfaces of the barn or other building 30. Preferably, a suitable sheet of flashing material 190 is also provided to overlay and protect the components thus far described from the elements. The door 34 is suspended from the lower pivot assembly 188 by means of an elongate externally threaded member 192 which extends through a suitable through aperture 193 provided in the end wall 80 of the top frame member 66. The lower end of this elongate fastener 192 extends through the slot 90 in the open sidewall of the frame member 66. Advantageously a stiffener bracket 170 as described above is utilized to receive the lower end of the fastener 192 and provide additional rigidity about the portion of the frame opening or slot 90 through which it extends. A suitable mating nut member 194 is provided at the lower end of the member 192 to hold the fastener 192 and stiffener bracket 170 in assembly with respect to the channel 66. This nut 194 also effectively defines the relative height at which the door 34 is suspended by the foregoing structure. Advantageously, it will be seen that the height of the door 34 may therefore be readily varied as desired by rotation of the nut 194 to achieve proper suspension thereof in the opening provided therefor in the barn or other building 30.

In accordance with a further feature of the hanger assembly 183, a second nut member 196 is also provided at the upper end of the elongate threaded member 192 and is in engagement with the upper base surface 80 of the frame member 66. An additional suitable flashing member 198 is also interposed intermediate the nut 196 on top surface of frame 66 and preferably overlies the upper edge of the siding material 62 of the door 34. Advantageously the provision of the upper nut member 196 substantially resists upward vertical movement or "lifting" of the door 34 in response to external forces such as wind. In this regard, the phenomona of wind lift has often been encountered in prior art sliding door arrangements, and can cause damage and/or deformation to the sliding door structures heretofore provided.

The suspension system described above substantially avoids problems of misalignment and wind lift encountered with many prior art arrangements. Moreover, re-adjustment of the suspension system of the invention permits the height of the door to be suitably adjusted for free sliding action thereof even after initial installation. Preferably, two similar such truck and suspension structures at spaced apart locations are utilized for each of the sliding doors 34, 36, see FIG. 2.

As further illustrated in FIG. 13, a center stop and latch arrangement is also provided for doors 34 and 36. Preferably, a stop along the overhead track or channel 180 is provided by the simple expedient of interposing a stop member such as a length of wood 200 at the end or center portion thereof, depending on whether a single sliding door or double doors 34, 36 as in the illustrated embodiment are utilized. As also shown in FIG. 2, end portions 201, 203 of this center stop member 200 are located to provide stops for the trucks 182 as the doors 34, 36 reach a center or fully closed position.

Referring to FIG. 2 and FIG. 13, upon reaching the center position a latch assembly is provided for each of the doors 34, 36 to promote positive closing. In the illustrated embodiment, as best viewed in FIG. 13, each latch assembly comprises a strike plate 202 having a suitable strike aperture 204 positioned for accepting and retaining a strike member 206 mounted to each door 34, 36. Advantageously, the strike plate 202 is provided with a suitable cammed or inclined strike surface 208 to guide the strike member 206 into engagement with the strike aperture 204 as the door 34 slides in the direction indicated generally by the arrow 212, whereupon the strike member 206 will be engaged in aperture 204 to latch the door in the closed position. The strike plate 202 is preferably mounted to the central wood or stop member 200 by suitable means such as screws 213. Suitable through apertured flange portions 214 and 216 are provided at the respective ends of the strike plate 202 for flat abutment against the under surface of the member 200 and for receiving the attaching screws or other means 213 therethrough.

Strike member 206 is carried in a spring loaded assembly including a compression spring 210 which is mounted within the vertical frame member 72 of the door frame 60. In this regard, a suitable generally elongate, U-shaped bracket member 218 having suitable top and bottom apertures 219, 221 for receiving the strike 206 is provided. The upper portion of strike 206 is shaped to interfit with the strike aperture 204 of the strike plate 202 and preferably has a somewhat rounded upper surface 206a, to promote sliding engagement along the cam surface 208 of the strike plate 202. Axially spaced from the strike engaging surface 206a the strike member 206 is preferably stepped inwardly as indicated at 220 to provide an abutment for the adjacent end of compression spring 210. The opposite end of the spring 210 abuts the lower end of the mounting bracket 218. A lower, reduced dimension portion 206b of the strike member 206 extends through aperture 221 in the lower end of bracket 218. A suitable chain 222 or other elongate means is coupled to this end 206b and extended through the channel 72 to a handle or other mechanism to effect release of the strike 206 from the strike aperture 204 for opening the door 34.

Referring again briefly to FIG. 2, it will be seen that the chain or other elongate flexible coupling member 222 may be brought out through the open side wall portion 90 (not visible in FIG. 2 but shown in FIG. 21) of the vertical frame member to engage a lever 224 for operating the spring loaded strike assembly as described. The lever 224 preferably is coupled by a rod-like extension 226 to the previously described handle operating mechanism 58 mounted exteriorally of the door 34 or 36. Hence, the latch assembly for the sliding door of the invention may readily be operated from the exterior thereof as previously mentioned.

Reference is next invited to FIGS. 15 and 16 wherein the guide arrangement briefly referred to above with reference to FIG. 1 is illustrated in detail. Initially, it will be seen that the guide members or tracks 46, 48 each comprise a section of channel 230 in FIGS. 15 and 16, which is identical in U-shaped cross-sectional configuration to the material from which the frame members and guide track 180 are cut. Hence, the section of channel 230 for guide members 46 and 48 may be suitably formed by cutting stock channel material described above to a suitable length, as desired. Preferably, a section of flashing 232 is also provided over and about the channel 230 to protect it and the associated structure from the elements. It will be noted that the slot 90 in the open side wall of the channel section 230 faces in a downward direction with respect to the sidewalls 42, 44 of the structure, thus promoting drainage and further discouraging the ingress of dirt, debris, snow, ice or the like and providing for free sliding of the door 36 along the channel 230.

The door 36 is provided with a cooperating guide pin member 234 which is preferably a cylindrical, L-shaped pin having a first leg 236 thereof shaped for reception in and slideable engagement with the slot 90. The remaining leg 238 of the L-shaped pin member 234 is preferably externally threaded as indicated at 239. This threaded end 238 of the pin 234 is engaged by nuts 241, 243 with a suitable slot 240 provided in a mounting bracket 242 providing for adjustment in the position of said pin 234. Bracket 242 is L-shaped having a relatively shorter leg 242a thereof coupled with the outer most frame member 70 of the associated door 34. Preferably a coupling arrangement comprising the bolt or screw 112 and nut member 114 described above are utilized for this purpose. However, it will be noted that in this instance the orientation of the fastener member 114 is inverted so that the side surfaces 118, 120 thereof abut the inner end or base surface of the channel 70. A relatively longer leg 242b of the bracket member 242 carries the aperture 240 which will be seen in FIG. 16 to preferably comprise an elongate slot for suitably positioning the guide pin member 234 at a desired location along its length. It will further be noted that the lengths of the legs 236 and 238 of the guide pin 234 are sufficient to allow variable axial positioning thereof within bracket 242 and channel 230, respectively. These features accommodate the range of adjustment of height of the door 34 provided by the suspension structure just described with reference to FIGS. 13 and 14, and the spacing of the door from sidewall 42 of the building 30 to permit free sliding of the door 34.

The guide structure comprised of the channel 230 and pin 234 just described avoids the problems encountered in the prior art due to the clogging of the guide channels by dirt, debris, snow, ice and the like. Advantageously the downward orientation of the slot 90 of the channel guide 230 avoids such accumulation. Moreover, as previously mentioned, the guide 230 may be mounted at a suitable height on the sidewalls 42, 44 of the building 30 above the ground or grade level 50 to avoid accumulations of snow or the like hindering the operation thereof. In this regard, the cooperating pin member 234 and bracket 242 may be mounted at any vertical level along the side channel or frame member 70 to cooperate with the level selected for mounting of the guide channel 230. With the guide tracks 46, 48 mounted some distance above the lower edge of the door, as illustrated at 52 in the right hand portion of FIG. 1, the structural integrity of the door is increased. More specifically, the outer vertical edges of the doors 34, 36 will be supported at all times by the guide tracks 46, 48 at a location intermediate their respective lengths, thus rendering the doors less susceptible to wind damage.

Reference is next directed to FIG. 17 wherein one form of edge guide assembly 250 is illustrated. Preferably, this edge guide assembly 250 is mounted at a lower outer edge of each door 34, 36 as shown in FIG. 2. Accordingly at least an outer, lower edge portion of the assembled door 34 will always be present within the edge guide 250, thus helping to avoid any problems due to wind lift, or the like.

The edge guide 250 comprises a relatively short, U-shaped bracket member 252 which is suitably mounted to an extension 254 of the lower edge part of door frame 255 provided for the structure or building 30. Suitable fasteners such as screws 256 may be utilized for this purpose. Additionally, a guide member 258 is also provided. This guide member 258 comprises a flat strip of material having flared lateral edge portions to provide a guide for initial slideable mounting of the door 34 with respect to the edge guide member. It will be appreciated from the foregoing that the lower edge of the door 34 will be located and supported within the edge guide assembly 250 at all times, without regard for the relative position of the door 34 as it slides between its fully opened and fully closed positions.

Advantageously, provision of this additional edge guide 250 provides another point of slideable engagement with the door 34 to resist movement thereof in response to external forces such as wind or the like. This feature is particularly advantageous when the door is in its fully open position against the adjacent sidewall 42, whereupon a trailing or inside lateral edge portion of the bottom thereof will be securely slideably held within the edge guide member 250. This holding, together with the guide assembly described above with reference to FIGS. 15 and 16 and the suspension described above with references to FIGS. 13 and 14 securely holds the door at four laterally and vertically spaced points against potentially damaging gusts of wind or the like.

Reference is next invited to FIGS. 18 through 20 wherein there is shown a novel center guide and stop arrangement for accommodating a single sliding door or double sliding doors 34, 36 of the illustrated embodiment. This novel center guide and stop arrangement cooperates with the center latch arrangement described above to ensure proper centering and retention of the doors when in the fully closed position. Moreover, the guide and stop arrangement also aids in resisting movement of the doors in response to gusts of wind or the like when in the fully closed position.

The center guide and stop arrangement includes a generally U-shaped stop member 260 which has laterally outwardly extending ears or flange portions 262, 264, FIG. 19, for attachment thereof to a mounting surface provided at the center of the doors 34, 36 at the grade or ground level 50 by a bracket 265. The bracket 265 is coupled to these ears or flanges 262 by means such as nuts and bolts, as indicated at 266. The bracket 265 may be secured to a member such as a wood post 268 which is mounted in a cement footing 270 or the like somewhat below the grade level 50, or the U-shaped stop member 260 may be mounted directly to a concrete approach by the use of screws and concrete expansion anchors. The open lateral ends of the U-shaped channel member 260 face in the directions of the respective slideably mounted door assemblies 34 and 36. Hence, the U-shaped member 260 is positioned for receiving a complimentary dimensioned hook member 272 which is carried by, the lower inner edges of the respective door assemblies 34 and 36.

Referring to the door assembly 34, it will be seen that the hook member 272 is a generally L-shaped piece of material. In this regard, both the hook member 272 and the stop member 260 are preferably formed of relatively heavy gauge material to ensure structural rigidity and durability thereof. The shorter leg of the L-shaped member 272 has a converging leading edge 273 to ensure initial guidance thereof into the open end of the member 260. The longer leg 272a of this L-shaped member 272 extends into the frame member 72 of the door structure 34. A U-shaped clamp bracket member 276 is provided interiorally of the frame 72 and is of substantially similar structure to the bracket 218 described above with reference to FIG. 13. This latter bracket 276 is dimensioned for clamping the longer leg 272a into close engagement with the composite flange portions 86, 88 interiorally of the frame 72. A suitable through slot 280 is provided in the longer leg 272a through which is disposed a screw or bolt 112 which draws the bracket 276 into clamped position. The slot 280 permits the leading edge 273 to be vertically adjusted to ensure proper engagement with the bracket 260.

As the door 34 or 36 approaches the closed position, the leading edge 273 of member 272 will be guided for disposition within the open end of the guide and stop member 260. Abutment of the hook-like member 272 with the stop member 260 serves to limit movement of the door, and will center the doors 34 and 36 in the closed position. Further, with the hook member 272 engaged within stop member 260 the leading, lower edge of the door is securely held in the closed position against any forces occasioned by potentially damaging gusts of wind.

Finally, attention is invited to FIGS. 21-23 wherein there is illustrated a preferred construction for the handle mechanism 58. The mechanism 58 is mounted to a horizontal U-shaped cross member 76 utilizing the above discussed coupling arrangement provided by a bolt type fastener 112 and an elongate nut-like member 114, as shown in FIG. 22. The mechanism 58 includes a main mounting bracket 290 which is generally C-shaped. Extending through a vertical section 292 of the bracket 290 is the aforementioned rod-like operating member or stem 226 to which the lever 224 is removably mounted. A stem support bracket 293 is carried by the main bracket 290 which supports the free end of the rod-like stem member 226. To the opposite end of member 226 there is affixed a handle 294, which is disposed exteriorly of the frame or skin 62. As is illustrated in dotted outline in FIG. 21, rotation of the handle 294 will produce rotative movement of the lever 224 and corresponding movement of chain 222 attached thereto.

With reference to the right hand side of FIG. 21, it can be seen that the chain 222 extends into the interior of the vertical side frame section 72, and upwardly, wherein said chain is affixed to the strike member 206, as shown in FIG. 13. Affixed to the bracket 100 used to join frame sections 76 and 72, is a chain guide 296 which includes an arcuate portion 298 that facilitates and guides movement of the chain 222.

Looking to FIG. 23, it should be noted that the upper section 300 of the C-shaped mounting plate 290 includes a slot 302. Disposed in the slot is the end portion 304 of the lever 224, which end portion is notched or of a reduced width. The engagement of end portion 304 in slot 302 defines the limits of movement of the lever 224 between the positions shown in FIG. 21.

Recalling that the chain 222 is affixed to the strike 206, the force applied on the strike 206 by spring 220, FIG. 13, is transmitted to lever 224 by chain 222. This force tends to bias the lever 224 in a counter-clockwise direction, as viewed in FIG. 21, thereby moving the notched or reduced end portion 304 of the lever into engagement with the edge of slot 302, the full line position of FIG. 21. Operation of handle 294 thus can only rotate the lever 224 in a clockwise direction to the dotted position of FIG. 21 causing the chain 222 to retract, which also retracts the latch bolt 206.

It should be noted that the operating mechanism 58 is "non-handed" in that it can be used on either the left hand door 34 in an orientation as shown in FIGS. 21-23, or on the right hand door 36. To adapt the mechanism 58 for the right hand door 36, all that need be done is to remove the lever 224 from the rod-like or post member 226 and invert its orientation. More specifically, with regard to FIG. 21, the mechanism 58 is set up for mounting to the left hand door 34 with the notched end 304 of the lever 224 oriented to the left as viewed. If the lever 224 is inverted or reversed in its orientation the notched end 304 will be disposed to the right as viewed. Thus, when this end portion 304 is engaged in slot 302 and is affixed to the chain 222 for the latch mechanism of right hand door 36, the chain will bias the lever 224 in a clockwise direction to engage the slot periphery. With this alternate arrangement (not shown) the lever 224 can only move in a counter-clockwise direction upon operation of handle 294.

Accordingly, a supplier of the overall door system need only stock one type of operating mechanism, as the mechanism 58 of FIGS. 21-23 can be employed for either right or left hand doors. This feature thus further serves to reduce the inventory of parts required and to enhance the usefulness of the overall system.

What has been illustrated and described herein is a novel and improved door frame system or assembly. While the invention has been illustrated and described herein with reference to preferred embodiments, the invention is not limited thereto. Those skilled in the art may devise various alternatives, changes and modifications upon reading the foregoing descriptions. The invention is intended to include such alternatives, changes and modifications insofar as they fall within the spirit and scope of the appended claims.

The invention is claimed as follows:

1. A door frame system for a frame-and-panel door construction for a barn, or similar structure, comprising: a plurality of horizontal frame members including vertically spaced top and bottom horizontal frame members, and a plurality of horizontally spaced vertical side frame members joined with said top and bottom frame members to define a generally rectilinear frame structure, said top, bottom and side frame members comprising elongate, substantially U-shaped channel members of similar cross-section, and corner joining means comprising corner brackets for joining respective top and bottom frame members with respective adjacent vertical side frame members to define corner joints for said substantially rectilinear frame structure, each said corner bracket comprising transversely disposed base sections, each said base section having spaced upstanding side flanges thereto to define a pair of similar U-shaped surface configurations for embracing respective outer side faces of the side walls of the respective U-shaped frame members, and clamping means for coupling said corner backets to the respective frame members.

2. A frame system according to claim 1 wherein the respective continuous side walls of each of said U-shaped channel members adjacent the open side wall include stepped portions for receiving the side flanges of said U-shaped corner brackets, which side flanges are engaged with, and overlie the outer surfaces of said stepped portions so as to maintain substantially planar side surfaces for the assembled frame members and brackets.

3. A frame system according to claim 1 wherein each said U-shaped channel member comprises a base wall and a pair of substantially parallel and co-extensive side walls integral with said base wall and disposed at substantially right angles thereto, said base wall and side walls defining the continuous side walls for said frame members said sidewalls respectively terminating in substantially similar laterally oppositely extending composite flange members comprising first flange portions substantially parallel to said base wall and second flange portions projecting internally from said first flange portions and spaced apart in inwardly facing relation the first and second flange portions defining the open side wall of said U-shaped channel.

4. A frame system according to claim 1 and further including at least one intermediate frame member coupled intermediate said top and bottom frame members of said pair of side frame members by substantially identical corner brackets, said intermediate frame member also comprising an elongate substantially U-shaped channel member of substantially identical cross-sectional configuration to said horizontal and vertical frame members.

5. A frame system according to claim 4 wherein said at least one intermediate channel is horizontally disposed, substantially in parallel relation to the respective top and bottom frame members and coupled at respective outer ends thereof with the respective side frame members.

6. A frame system according to claim 1 wherein each said clamping means comprises an externally threaded fastener and a mating internally threaded elongate nut member having a cross-sectional dimension for complimentarily interfitting through the open side wall of said U-shaped channel member to be slideably insertable therethrough and a length dimension greater than the internal spacing between facing interior surfaces of the spaced continuous side walls, for engaging at least one of said interior side wall surfaces to prevent rotation thereof during threadable advancement of said externally threaded fastener member, and each of said corner brackets including a through aperture at each section thereof facing a frame member for receiving one said externally threaded member.

7. A frame system according to claim 6 wherein said open end wall is defined by oppositely facing spaced composite flange members, each defined by a first flange portion and a second flange portion extending internally of said frame member, and said internally threaded nut member includes at least one downturned end portion at a longitudinal end thereof and directed generally toward said fastener for engaging an interior surface of one of said second flange portions defining said open end wall to further prevent rotation of said internally threaded fastener member during threadable advancement or retraction of said externally threaded fastener member with respect thereto.

* * * * *